United States Patent [19]

Keefover-Ring et al.

[11] Patent Number: 5,418,050

[45] Date of Patent: May 23, 1995

[54] FIRE/HEAT BARRIER LAMINATES

[75] Inventors: Kenneth M. Keefover-Ring, Mesa; George T. Geisendorfer, Gilbert, both of Ariz.; Hugh A. Yap, Marysville, Wash.

[73] Assignee: ICI Composites Inc., Tempe, Ariz.

[21] Appl. No.: 56,107

[22] Filed: May 3, 1993

Related U.S. Application Data

[63] Continuation-in-part of Ser. No. 681,034, Apr. 5, 1991, abandoned.

[51] Int. Cl.$^6$ .................................................. B32B 5/02
[52] U.S. Cl. ...................................... 428/237; 428/364; 428/375; 428/426; 428/436; 428/902; 428/920
[58] Field of Search ............... 428/297, 298, 116, 364, 428/237, 375, 477.7, 426, 435, 920, 902, 241, 283, 921

[56] References Cited

U.S. PATENT DOCUMENTS

| | | | |
|---|---|---|---|
| 3,811,997 | 5/1974 | Yuan | 428/435 X |
| 4,308,197 | 12/1981 | Byrd et al. | 428/272 |
| 4,678,700 | 7/1987 | McAloon et al. | 428/198 |
| 4,767,656 | 8/1988 | Chee et al. | 428/116 |
| 4,990,405 | 2/1991 | Bohrm et al. | 428/413 |

*Primary Examiner*—D. S. Nakarani
*Assistant Examiner*—H. Thi Lê

[57] ABSTRACT

The present invention is a fire/heat barrier laminate comprising a light weight glass scrim impregnated with a layered mineral which scrim is laminated to one or both sides of an impact structural layer made of an aromatic polyamide fiber.

5 Claims, No Drawings

FIRE/HEAT BARRIER LAMINATES

This is a continuation-in-part of application Ser. No. 07/681,034 filed on Apr. 5, 1991, now abandoned.

BACKGROUND OF THE INVENTION

Structural layers of composite materials such as organic fibers, particularly polyaramid fibers sold under the trademark KEVLAR, are known in the art. While providing adequate structural properties these materials cannot pass the fire and heat barrier tests required for use in certain applications.

A problem in the fire heat barrier art is the production of a light weight fire/heat barrier which maintains laminar integrity with the structural composite member to which it is laminated, produces a minimum of burn by-products, has a high performance to weight ratio, has a low backside heat temperature when exposed to flame or heat, and is processable on a mass production basis. This problem has been particularly exemplified in the aerospace industry where lighter weight materials are at a premium due to the sharply rising costs of energy. As known to those skilled in the art, light weight is not the sole criteria for material selection. The performance to weight ratio should not be compromised.

It is known in the fire barrier art that some inorganic oxides can be combined with composite materials. However, past fire/heat barriers have been troubled by excessive weight, laminar failure during the useful life of the barrier, failure to provide a sufficient heat barrier, and/or failure to provide a light weight barrier capable of performance as a wear material.

SUMMARY OF THE INVENTION

In accordance with the present invention the fire/heat barrier properties of an aromatic polyamide (polyaramid) fiber composite are improved by laminating to a surface of such composite a light weight glass scrim impregnated with a layered mineral. Thus the present invention provides a laminate comprising (A) a fire and heat barrier layer comprising a light weight glass scrim impregnated with a layered mineral and (B) a structural layer comprising an aromatic polyamide fiber.

DETAILED DESCRIPTION OF THE INVENTION

The present invention is a light weight laminate comprising a combination of (1) a first fire/heat barrier material which is a light weight glass scrim impregnated with a layered mineral and (2) an impact/structural layer of a composite material prepared from an aromatic polyamide fiber. In addition to a single layer the structural/impact layer may comprise a plurality (preferably 4 to 6) of plies of the polyaramid fiber material.

The laminate provides a barrier to a heat source in the environment on either side of said laminate. The barrier to the heat source is found advantageous when the heat source is placed on the structural side but to a lesser extent than when the heat source is on the fire/heat barrier side of said laminate. In a further embodiment the invention comprises a three layer structure wherein the fire/heat barrier is laminated to both side of said structural layer. In another embodiment the structure of this invention may be manifested as a honeycomb structure, as well. In this embodiment a honeycomb material such as those which are conventional in the airline industry is adhered to the side of the structural layer opposite the fire/heat barrier layer. Thus the resulting structure comprises in order, the impregnated glass scrim layer, the structural layer and the honeycomb material. The honeycomb material includes honeycomb cores of varying thickness and cell shapes and solid cores that find application in the walls, ceilings, partitions, and the like in airplanes. Illustrative of such honeycomb paper cores is a core prepared from paper material available from E. I. dupont de Nemours and Co., Wilmington, Del., under the trade name NOMEX ®. The cells of the honeycomb paper core may be of any shape conventionally used in the art. The materials from which these honeycomb cores are produced are preferably fire resistant or inflammable materials that do not contribute to any significant degree to the heat output of the composite of the present invention. The structural layer may also be applied to solid cores where the weight of the panel is not critical or the honeycomb material does not supply the necessary support strength.

The laminates of this invention provide a surprisingly effective fire/heat barrier material useful, for example as a cargo liner in aircraft. A preferred embodiment of an aromatic polyamide material is the structural material known as Kevlar ® aramid. This material is a high strength aramid fiber prepared from an aromatic polyamide polymer. A most preferred embodiment for the impact/structural material is the polyaramid known as Kevlar ® 29.

The fire/heat barrier layer is a light weight glass scrim impregnated with a layered mineral. The amount of layered mineral in this layer is equal to from about 1 to about 99 weight percent, preferably about 5 to about 75 weight percent, and most preferably about 20 to about 65 weight percent based on the total weight. The remaining weight percent is binder. The preferred layered minerals are the micas, especially white Muscovite mica. Other layered minerals such as vermiculite may be utilized. However, vermiculite is not preferred since it has been found to result in a lower peel strength value.

The individual particles of the layered mineral may range in diameter from about 0.5 to about 150 microns, preferably about 1 to about 100 microns, and most preferably about 1 to about 50 microns. The individual laminate layers may range in thickness from about 2 mils up to about 1000 mils. A peel strength, as a measure of adhesion of the fire/heat barrier layer to the structural layer, of greater than 5 inch pounds per 3 inch width is found to be desirable in most applications of the laminates of this invention. It is preferred, for use as a cargo liner in aircraft, that the peel strength is greater than 10 inch pounds per 3 inch width, and it is most preferred that the peel strength is greater than about 15 inch pounds per 3 inch width.

The method of making the laminate initially involves fabrication of the individual layers. The fire/heat barrier is made by mixing the layered mineral with a suitable binder and a solvent for the binder. Binders which may be used include organic resins such as polyarylsulfones, polyethersulfones, polyetheretherketones, polyimides, cyanate esters, phenolics, epoxies, silicones, nylons and combinations thereof. Of these, polyethersulfones (PES) are preferred. Either an organic solvent or water may be used depending upon the binder employed. The resulting mixture is then used as a dip coating for the glass scrim. The solvent is then driven off of the impregnated scrim. The binder then may be cured. Most preferably, a binder comprising polyvinyl formal and PES, is dispersed in N-methyl-2-pyrrolidone and the dispersion is admixed with white Muscovite mica. The admixture is dip coated onto a glass fabric and oven dried. This produces the fire/heat barrier layer used in the laminate.

The impact and/or structural layer is combined with the fire/heat barrier layer producing the fire/heat barrier laminate structure of the present invention. Preferably, the impact and/or structural layer is combined with the fire/heat barrier layer by pressing, vacuum forming, autoclaving, vacuum bagging, and/or spray coating the fire/heat barrier layer onto the structural layer. Most preferably, the impact and/or structural layer, Kevlar ®, is first coated with a resin matrix comprising PES and polyvinyl formal binder, and then the fire/heat barrier is pressed to the impact and/or structural layer to form the laminate structure.

Optionally, the side of the laminate opposite the impact and/or structural layer may be combined with some other material as a third layer for decorative purposes. Advantageously, a material such as Tedlar ® polyvinylfluoride film has been found to provide such a surface for the purpose of decoration and/or cleanability. In a three layer laminate comprising (a) fire/heat barrier, (b) impact/structural layer and (c) fire/heat barrier both of the fire/heat barrier sides may be laminated with a third layer.

In order to insure integrity at the interfaces of the individual layers in the laminate additional binder may be added or the binder combined with the layered mineral may be relied upon to provide the bond needed for a high strength fire/heat barrier laminate. If it is used, the additional binder is selected from the above disclosed binders used for the layered mineral.

The present invention can be advantageously employed in aerospace and marine environments; in ground transportation such as trains, cars, and buses; in space applications, and in any applications where a light weight fire/heat barrier is important. It is found to be particularly useful as a cargo liner for aircraft.

The following examples are provided to further illustrate the invention and are not intended to limit the scope of the invention in any manner.

EXAMPLE 1

To make the fire/heat barrier layer, 435.0 grams of PES 3600P, Victrex PES obtained from ICI Americas Inc., was dissolved in 1474.0 grams of N-methyl-2-pyrrolidone. 51.5 grams of Formvar 15/95E polyvinyl formal resin, obtained from Monsanto, and 26.3 grams of Santicizer 8 (N-ethyl-o and p-toluenesulfonamide), obtained from Monsanto, were dissolved into the solution. Next, 13.2 grams of Cab-O-Sil M5, obtained from Cabot Corporation in Tuscola, Ill., and 421.0 grams of C-1000 Micro Mica, obtained from KMG Minerals, Inc. Kings Mountain, N.C., were dispersed into the solution. Style 112 glass fabric was dipped into the above solution and dried for 10 minutes at 177 degrees centigrade to yield a fire heat barrier layer with a resin content of about 60 plus or minus 3%.

The impact/structural layer was processed in the following manner. 3107.0 grams of PES 3600P was dissolved in 3063.0 grams of N-methyl-2-pyrrolidone, 3289.0 grams of dimethyl formamide, 1744.0 grams of xylene and 2441.0 grams of methyl ethyl ketone. Next, 368.4 grams of Formvar 15/95E and 186.4 grams of Santicizer 8 were dissolved in the solution. 93.2 grams of Cab-O-Sil M5 was dispersed into the solution. Kevlar 29 style 710 (scoured) was dipped into the above solution and dried for 10 minutes at 177 degrees centigrade to yield a prepreg with a resin content of 25 plus or minus 2%.

The two layered structures were laminated to form a single structure. One ply of the impact/structural layer prepared above was combined with one ply of the fire/heat barrier layer prepared above. An additional layer of one ply of TWH10BX8, Courtaulds Performance Films, Chandler, Ariz., acrylic adhesive coated white bondable Tedlar ®, with the adhesive toward the fire/heat barrier layer was added and the layers were pressed between two stainless steel caul plates, protected with FEP release film, for 30 minutes at 177 degrees centigrade and 300 psi.

The laminate was tested for fire/heat barrier properties, being subjected to the "burn through" test. The burn through test is the FAA "oil burner" test described in 14 CFR Ch.1 Sections 25.855 and 25.857. A flame of 927 degrees centigrade with a heat flux of 91 kilowatts per square meter was applied to the fire/heat barrier layer for 5 minutes. The temperature was monitored on the impact/structural layer side of the structure 10.2 centimeters from the surface. The result of this test showed that the fire/heat barrier layer prevented any flame from penetrating the structure for the time of the test and the temperature of the backside of the structure was 90.9 degrees centigrade. Failure under this test occurs if flame is detected through the structure and/or heat is detected above 204 degrees centigrade.

Adhesion of the layers of the laminate was tested by the ASTM D 1781 test procedure. The results of this test showed a peel strength of 21.2 inch pounds per 3 inch width (31.4 newton meters per meter width). For this application the adhesion test was acceptable if the peel strength was over 10 inch pounds per 3 inch width.

EXAMPLE 2

Example 2 was made in the same manner as Example 1, except that Example 2 had 4% less by weight white Muscovite mica and the Kevlar ® style was 745. Adhesion of the layers was tested as in Example 1. The results of this test showed a peel strength of 18.0 inch pounds per 3 inch sample.

EXAMPLE 3

In Example 3 the inorganic oxide in the fire/heat barrier layer was changed from mica to vermiculite in the same manner as in Example 1. This sample gave acceptable burn through test values, but exhibited a poor peel strength.

What is claimed is:
1. A laminate comprising
   A. A fire/heat barrier layer comprising a glass scrim, a binder resin and a material selected from the group consisting of micas and vermiculite, wherein the binder resin is selected from the group consisting of polyarylsulfones, polyethersulfones, polyetherether ketones, polyimides, cyanate esters, phenolics, epoxies, silicones, nylons, and combinations thereof, and
   B. A structural layer comprising an aromatic polyamide fiber.
2. A laminate, as claimed in claim 1, wherein the layered mineral is mica.
3. A laminate, as claimed in claim 2, wherein the mica is white Muscovite mica.

4. A laminate, as claimed in claim 1, wherein the structural layer comprises a plurality of plies of the aromatic polyamide fiber.

5. A laminate comprising
- A. a first fire/heat barrier layer comprising a glass scrim, binder resin and a material selected from the group consisting of micas and vermiculite laminated to
- B. a first surface of an impact/structural layer comprising an aromatic polyamide fiber, and
- C. a second fire/heat barrier layer comprising a glass scrim, a binder resin and a material selected from the group consisting of micas and vermiculite, laminated to a second surface of the impact structural layer wherein the resin binder of the first and second fire/heat barrier layers is selected from the group consisting of polyarylsulfones, polyethersulfones, polyetherether ketones, polyimides, cyanate esters, phenolics, epoxies, silicones, nylons, and combinations thereof.

* * * * *